3,249,024
METHOD AND APPARATUS FOR ASSEMBLING CARTONS
Thomas B. Shiu, Chicago, Ill., assignor to Machinery Development Corporation, Chicago Heights, Ill., a corporation of Illinois
Filed Nov. 8, 1961, Ser. No. 150,934
13 Claims. (Cl. 93—36)

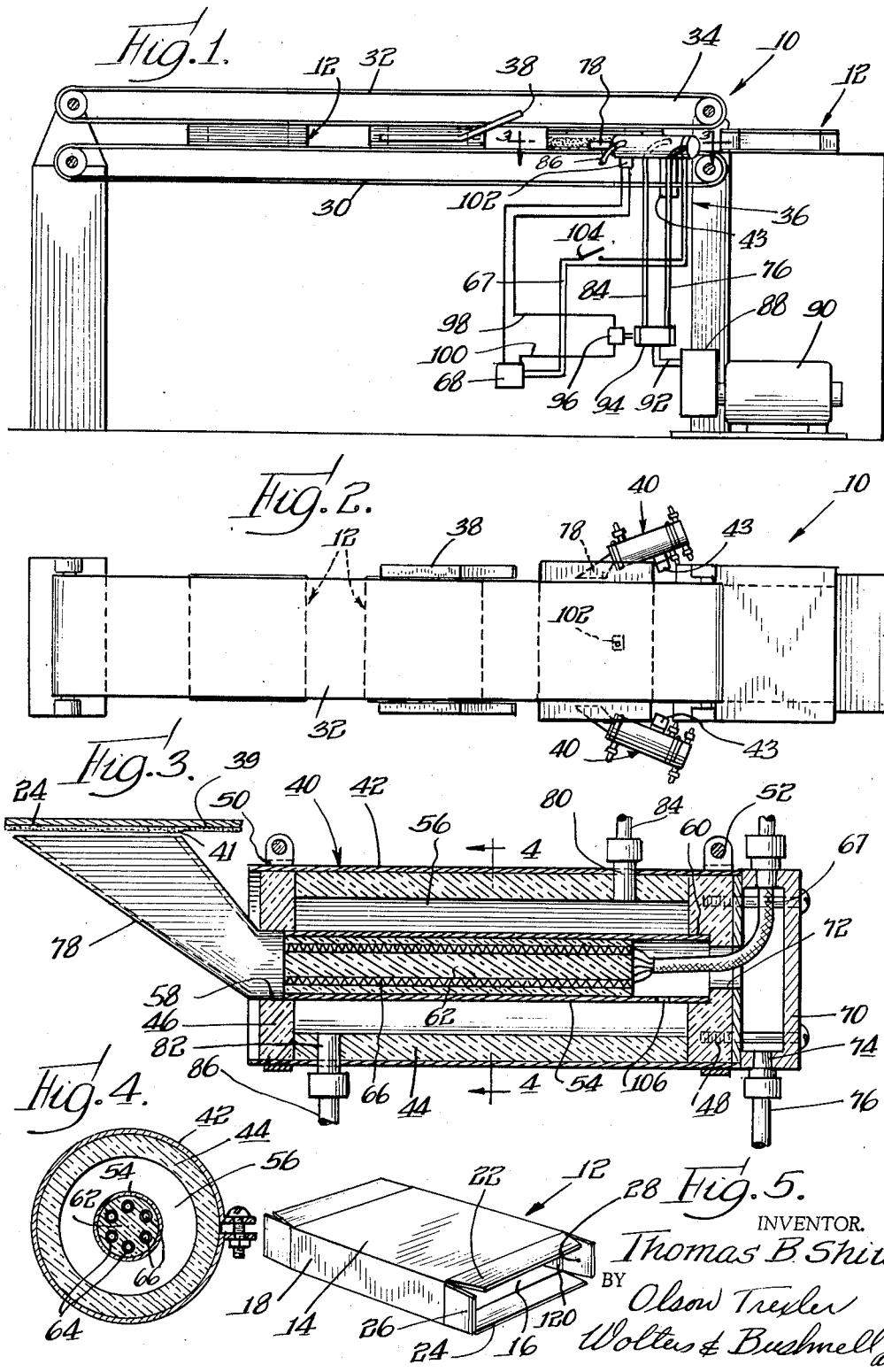

The present invention relates to a novel method and apparatus for processing or assembling articles having sections which are to be adhesively connected, and more specifically to a novel method and apparatus for assembling packages such as cartons, wrappers and the like.

As will be apparent, the method and apparatus of the present invention may be adapted for processing or assembling numerous different packages or other articles having sections which are to be adhesively connected together. For example, numerous sheet material cartons or other packages have heretofore been suggested, which packages include side or closure structures comprising a plurality of panels or flaps adapted to be folded into assembled relationship and adhesively secured to each other. It has further been proposed to apply a temperature responsive or thermoplastic adhesive material to at least a portion of the package panels or flaps to be joined prior to the time at which the packages are to be folded or otherwise processed into an assembled condition. Such prior proposals also contemplate that heat and pressure should be applied to the flaps or panels to be joined so as to activate the adhesive material and to hold the flaps or panels together until the adhesive connection has been effected.

When processing packages in accordance with the prior proposals outlined above, the specific construction of the package and placement of the adhesive material thereon has been limited by the requirement that direct contact between the adhesive and the heat and pressure applying means of the processing apparatus be avoided so as to prevent fouling of the apparatus and injury to the packages. Furthermore, it is frequently desirable to coat packages with a wax or other suitable material and again the use or location of such coating material on a package has heretofore been limited or controlled by the need for avoiding direct contact between the heat and pressure applying means of the processing apparatus.

An important object of the present invention is to provide a novel method and apparatus for assembling or processing packages or other articles having sections or panels to be adhesively secured together upon the application of heat and pressure, which method and apparatus are such as to permit the processing of a wide variety of packages or other articles and to enable an adhesive material or coating material to be applied to all or any portion of the packages or articles without restriction and without substantial danger of fouling of the apparatus or injury to the articles.

A more specific object of the present invention is to provide a novel method and apparatus of the above described type whereby the adhesive material on a package being processed may be heated and activated without direct contact with a heat source so as to avoid fouling of the apparatus or injury to the package.

A further important object of the present invention is to provide a novel method and apparatus capable of heating and activating adhesive material on portions of an article being processed which are to be secured together without unduly heating other portions of the article or surrounding parts of the apparatus.

A still further important object of the present invention is to provide a novel means for heating articles in the manner described above, which means may be installed as original equipment in an article or package processing apparatus or installed in a wide variety of existing machines.

Another specific object of the present invention is to provide a novel means for heating packages or articles being processed in the manner described above by preparing and using a flow of heated gas or air.

Another specific object of the present invention is to provide a novel heating unit or means of the type described above which is of simple construction and may be economically produced and operated.

Other objects and advantages of the present invention will become apparent from the following description and the accompanying drawing wherein:

FIG. 1 is a partially schematic view showing an apparatus incorporating features of the present invention;

FIG. 2 is a partially schematic plan view of the apparatus shown in FIG. 1;

FIG. 3 is an enlarged sectional view taken along line 3—3 in FIG. 1;

FIG. 4 is a sectional view taken along line 4—4 in FIG. 3; and

FIG. 5 is a perspective view of a carton which may be processed by the method and apparatus of the present invention.

Referring now more specifically to the drawings wherein in like parts are designated by the same numerals throughout the various figures, an apparatus 10 incorporating features of the present invention is shown in a partially schematic or simplified form in FIGS. 1 and 2. While as previously indicated, the apparatus may be adapted for processing packages or articles of numerous types, disclosure of the present invention will be facilitated by describing the apparatus as being especially suitable for processing or assembling foldable fibreboard packages or cartons 12. The cartons 12 may be of various known constructions and may, for example, include top and bottom panels 14 and 16 and front and back panels 18 and 20 connected together so that the carton may be provided in the partially assembled condition shown in FIG. 5 with one or both sides of the carton in an open condition to permit insertion of goods to be packaged therethrough.

In the embodiment shown, each of the opposite side structures of the carton 12 comprises outer and inner side panels 22 and 24 respectively extending from the top and bottom panels 14 and 16 and articulated thereto along scored bend lines. In addition, end flaps 26 and 28 extend from the front and back side panels 18 and 20. In order to close the side structures of the carton, the bottom or inner side panels 24 and the end flaps 26 and 28 are first folded inwardly whereupon the top or outer side panels 22 are folded downwardly and adhesively secured to the inner panels 24 in the manner described in detail below.

In order adhesively to join the inner and outer side panels of each side structure together, it is contemplated that a temperature responsive or thermoplastic adhesive material will be applied to at least one of the opposing surfaces of these panels prior to the time when the carton is delivered to the apparatus 10 for processing. Then as the carton passes through the apparatus which will be described in detail below, heat is applied in a manner which will cause the adhesive material to be activated and pressure is applied in a manner which will cause the outer panels 22 to be pressed against the inner panels 24 so as to effect the adhesive connection of these panels. It is further contemplated that a coating of wax or other desired material may be applied to the inner or outer surfaces of the carton for moisture control or a variety of other purposes. In order to provide substantially complete freedom of application of such coating materials and of the adhesive materials to any desired areas or surfaces of the carton, the persent invention contemplates that heat and pressure will be applied for closing and sealing the opposite side structures of the carton in a manner such that the closing and sealing may be effected rapidly, securely and efficiently while at the same time any possibility of the adhesive material or the coating material fouling the apparatus is eliminated as is any possibility of marring or injury to the carton be processed. More specifically it is contemplated that no portion of the apparatus including portions which serve to fold the various flaps and panels of the side structures and to press the side structure panels together will come into direct contact with adhesive or coating material on the carton which has been heated sufficiently to be activated or partially melted.

The apparatus 10 comprises conveyor means in the form of a pair of opposing endless belts or chains 30 and 32 or the like. The endless conveyor members 30 and 32 are preferably continuously driven in timed relationship for successively advancing a plurality of the cartons 12 along a predetermined path of travel. The cartons are fed and delivered to the apparatus 10 either manually or by suitable feeding means, not shown, in the partially assembled or set up condition shown best in FIG. 5. The apparatus 10 is provided with means, not shown, for folding the side structure panels and flaps 24, 26 and 28 inwardly and to their upright assembled positions as the cartons are advanced to a work station 34 adjacent one end of the conveyor members 30 and 32. As will be understood the means for folding the inner side panels and the flaps 26 and 28 may be of various known constructions including plow bars, rotating wheels or cam members, properly positioned endless belts, oscillating or reciprocating levers and the like so that such means need not be shown or described in detail.

Means is provided at the work station 34 for providing heat for activating the adhesive material on the cartons, which means will be described in detail below. Down stream of the path of travel of the carton from the work station 34 there is provided means 38 for folding the side panels 22 downwardly and pressing them against the previously inwardly folded panels 24 for effecting the adhesive connection between the panels. While the means 38 is shown in the form of plow bars disposed at opposite sides of the path of the travel of the articles or cartons, it is to be understood that various other pressure applying and folding devices may be employed.

In accordance with a feature of the present invention the heating means 36 comprises heater units or "heat guns" 40 respectively disposed at opposite sides of the path of travel of the cartons for directing streams or blasts of heated gas or air against selected areas of the cartons passing the work station 34. The heating means is controlled and related to the speed of the conveyor members 30 and 32 or the rate of advancement of the articles or cartons in a manner for causing a substantially predetermined number of B.t.u.'s of heat to be absorbed by the predetermined areas of each passing carton and/or the adhesive material on such areas for activating the adhesive material on the carton and enabling the adhesive connection between the inner and outer side panels to be effected when the panels are pressed together by the means 38. At the same time the heated air or gas is delivered so that surrounding portions of the cartons are not unduly heated and further so that surrounding portions of the apparatus are not unduly heated or heated in a manner which might cause injury to the cartons.

It is contemplated that the blast of hot gas or air may be impinged directly against adhesive material 39 located, for example, on outer surfaces of the inner side panels 24, as shown in FIG. 3. The blast may have sufficient force to cause the adhesive to flow into relatively thick ridges 41 which may aid assuring contact with the outer panel.

Alternatively, the adhesive material could be located on the inner surfaces of the outer side panels 28 and the inner side panels 24 may be heated sufficiently to cause the adhesive material to be activated when the outer side panels are pressed against the heated inner side panels. When either of these procedures are followed, the outer side panels 28 and particularly the outer surfaces thereof will remain relatively cool so that in the event a wax or other coating material is applied to the outer surfaces of the side panels 22 such wax or coating material will not be marred by the folding and pressure applying means 38 and, of course, such means will not be fouled by the wax or coating material.

It is still further contemplated that in certain instances, sufficient B.t.u.'s may be delivered to heat a flap or panel clear through while in other instances sufficient heat to activate adhesive material will only partially penetrate a flap or panel. The heating of a flap or panel clear through would enable, for example, the panels 24 to be adhesively secured to the flaps 26 and 28 as well as to the outer panels 22 provided of course, that adhesive material was suitably located or, if desired, the folding and pressure applying means 38 could be located at the work station 34 and the heat could be directed against the outer surfaces of the outer panels 22 for activating adhesive material either on the inner surfaces of the panels 22 or on the outer surfaces of the panels 24. On the other hand, in instances when panels such as the panels 24 are to be heated so that there is only a partial penetration of the heat, any possibility of such panels being adhesively joined to the flaps 26 and 28 is eliminated regardless of whether or not such flaps have an adhesive or coating material applied thereto. In other words, the heat applying means of the present invention is extremely versatile and can be used to satisfy a wise variety of requirements.

As shown best in FIGS. 3 and 4, each of the heater units 40 comprises an outer shell 42 to which a mounting bracket 43 (see FIGS. 1 and 2) is welded or otherwise secured. A cylinder 44 of insulating material fits snugly within the shell 42 and terminates short of opposite ends of the shell. Opposite end closure members 46 and 48 also formed of insulating material are inserted within opposite ends of the shell 42 and abut opposite ends of the cylinder 44. The end members 46 and 48 are secured within the opposite end portions of the shell by means of hose clamps 50 and 52 which are tightened so as to clamp the shell on the end members. Preferably the opposite end portions of the shell are axially split so as to facilitate this clamping action.

An elongated relatively small diameter tube 54 is centrally located within the shell in a manner which provides an annular air space 56 between the tube 54 and the cylinder 44 of insulating material. Opposite ends of the tube 54 are supported in apertures 58 and 60 formed in the opposite end members 46 and 48 respectively.

An elongated body 62 of ceramic or other heat resistant material is mounted within the tube 54. The body 62 is solid except for the provision of a plurality of circularly arranged small diameter passageways 64 which extend in parallel relationship between opposite ends of the body 62 as shown in FIGS. 3 and 4. Electrical heating elements or resistance wires 66 are respectively disposed in the passageways 64, which wires are connected by a cable 67 to a suitable source of electricity such as a terminal box 68 shown in FIG. 1.

As previously indicated each of the units 40 is adapted to deliver a stream or blast of heated air for projection against articles or cartons being processed. More specifically, each unit is provided with a hollow end assembly 70 mounted against the end member 48 and communicating with the interior of the tube 54 through the passageway 72 in the end member. The end assembly 70 is provided with an air or gas inlet 74 which is connected with a source of gas or air under pressure by a conduit 76. The gas or air entering the inlet 74 flows through the passageway 72 and into the tube 54 and then through the small passageways 64 where the air is heated by direct contact with the heating elements or wires 66. In this manner the gas or air may be heated very rapidly and efficiently to a relatively high temperature. The heated gas or air emerging from the passageways 64 flows through a nozle or tube means 78 which is mounted in the aperture 58 through the end member 46 and which serves to direct the heated air to a point immediately adjacent to and slightly spaced from the portion of an article or carton which is to be heated.

In order to minimize heat loss from the heated air or gas, each unit 40 is preferably mounted substantially as close as possible to the path of travel of the articles or cartons so that the length of the discharge conduit or nozzle 78 is minimized. The construction of the unit 40 is such that its over-all size or bulk is minimized so as to enable the unit to fit within the space limitations imposed by the remainder of the apparatus 10. At the same time, the construction is such as to accomplish rapid heating of the gas or air passing through the passageways 64 to a relatively high temperature without unduly heating the atmosphere or other portions of the apparatus immediately surrounding the unit 40. In this connection it is to be noted that an air inlet 80 is provided through the shell 42 and liner 44 to the annular space 56 adjacent the upstream end of the heater tube 54, and an air outlet 82 is provided through the shell and liner member adjacent the opposite end of the annular space 56. The air inlet 80 is connected by a conduit 84 with a suitable source of air under pressure while the outlet 82 is connected to an exhaust conduit 86 which extends to any desired point of discharge.

As shown in FIG. 1, the source of air under pressure may include a pump 88 driven by an electric motor 90 and having an outlet connected with a conduit 92 which in turn is connected to a two-position valve 94 of known construction. The valve has a pair of outlets respectively connected to the conduit 76 and the conduit 84. The valve 94 is spring biased so that the conduit 76 is normally blocked and the air under pressure is normally delivered through the conduit 84 for circulation through the chamber 56. The air flowing through the chamber 56 and out through the exhaust conduit 86 effectively prevents the heating elements and other parts of the heater unit from over heating and also removes sufficient heat so that the atmosphere and other parts of the apparatus immediately surrounding the unit are not overheated.

A solenoid 96 is associated with the valve 94 for operating the valve to close conduit 84 and direct the air through the conduit 76. The solenoid is connected with the terminal box 68 or any other suitable source of electric power by wires 98 and 100 and it is to be noted that a normally opened switch 102 is connected in the wire 98. As shown in FIGS. 1 and 2, the switch 102 is positioned for engagement with articles or cartons 12 being processed at a location slightly in advance of the nozzle 78 of the heater units. The switch 102 is constructed so that it will be closed when it is engaged by a carton for energizing the solenoid 96 and shifting the valve 94 whereby air will be directed through the heater passageways 64 and the nozzles 78 for impingement against the cartons. In the event that there is a gap in the line of cartons being processed, the switch 102 will open for deenergizing the solenoid 96 whereupon the spring biased valve will return to its normal position and the air will be directed through the chamber 56 for cooling purposes. This arrangement not only prevents overheating of the heater unit but also eliminates the discharge of unused heated air from the nozzel 78 which unused air would otherwise serve to heat the atmosphere and the portions of the apparatus in the immediate vicinity of the heater unit.

While the air is ultimately directed for heating and cooling purposes in the manner described above, the heating elements are preferably continuously energized while the apparatus is processing in a plurality of containers in order to minimize heating and cooling cycles of the elements 66 and thereby prolong the life thereof. Thus, a switch 104 which is provided in the cable 67 is closed at the start of an article processing operation and remains closed during the processing of a plurality of the articles. In order further to increase the life of the elements 66, the velocity of the air flowing through the passageways 66 is regulated and controlled at a relatively low value for minimizing or eliminating any tendency for the air to abrade the wire elements 66 or cause a protective coating or oxide which inherently forms thereon to flake therefrom.

As shown in FIG. 3, a small aperture 106 is provided in the tube 54 adjacent its upstream end for establishing communication between the interior of the tube and the annular chamber 56. With this aperture at least a small amount of air will continuously bleed either from the interior of the tube into the chamber 56 and up through the exhaust conduit or from the chamber 56 through the interior of the tube and out through the nozzle 78, depending of course on the position of the valve 94. In other words, there will always be at least some gas or air flow through both the heating passageways and the cooling chamber of the unit. Thus, the effects of inertia and turbulent fluid flow are minimized as the primary flow of air is switched back and forth between the heating and cooling passageways. As a result, when, for example, the primary flow of air is switched from the cooling chamber to the interior of the heater tube 54, the change in the flow may be accomplished substantially instantaneously and heated air will be discharged from the nozzle 78 without any material time delay. The flow of air between the interior of the tube 54 and the chamber 56 further minimizes any possibility of localized overheating of the unit.

While the preferred embodiment of the present invention has been shown and described herein, it is obvious that many details may be changed without departing from the spirit and scope of the appended claims.

The invention is claimed as follows:

1. An apparatus for processing articles having sections to be joined together and a heat responsive adhesive material on at least one of said sections, comprising means for conveying successive articles along a predetermined path of travel, means adjacent said path of travel for providing and continuously heating a flow of gas, means responsive to articles moving along said path of travel for directing the flow of heated gas against predetermined areas of at least one of said sections of successive articles and for exhausting the flow of heated gas in the absence of an article to a location remote from said path of travel, and means disposed adjacent said path of travel for relatively forcing said sections of successive articles into contact with each other for causing the heat responsive adhesive material to join said sections.

2. An apparatus, as defined in claim 1, which includes means responsive to successive articles advanced by said conveying means for initiating the stream of gas when an article is substantially in position for engagement with the stream and for discontinuing the stream of gas in the absence of an article.

3. An apparatus, as defined in claim 1, wherein said means for heating the gas comprises electric heating element means, and means for causing the gas to flow in contact with said element means when the gas is directed against an article to be heated, and means for directing said gas around and out of contact with said element means for cooling purposes when the gas is to be exhausted.

4. An apparatus, as defined in claim 3, which includes means for bleeding off a small portion of the flow of gas for cooling purposes when the flow is directed primarily in contact with the heating element means and for bleeding off a small portion of the flow of gas for contact with the heating element means when the flow is directed primarily for cooling purposes.

5. An apparatus, as defined in claim 1, wherein said means for heating the gas comprises an electric heater unit disposed adjacent said conveying means and having a passageway therethrough, means for supplying gas under pressure to said passageway and means for directing heated gas flowing from said passageway against cartons moving along said path of travel.

6. An apparatus, as defined in claim 5, wherein said heater unit comprises central tube means defining said passageway means, electric resistance means within said tube means for heating gas flowing through said passageway means, a shell enclosing said tube means and defining a chamber around said tube means, and means providing an inlet and an outlet communicating with said chamber means for permitting flow of cooling fluid through said chamber means.

7. An apparatus as defined in claim 6, which includes means providing a single source of fluid under pressure connected with said passageway means and with said chamber, and means for selectively directing the fluid under pressure to said passageway means and said chamber.

8. An apparatus, as defined in claim 7, wherein said heater unit includes opening means providing communication between said passageway means and said chamber for enabling a small portion of the fluid to flow between the passageway means and the chamber.

9. A heater unit comprising means providing a passageway for fluid to be heated, electrical resistance means within said passageway for heating fluid passing through the passageway, shell means defining a chamber around said passageway means, said shell means having an inlet and an outlet for permitting the flow of cooling fluid therethrough, and discharge conduit means connected with said passageway means and extending outwardly of said shell means for directing heated fluid to a desired point of discharge.

10. An apparatus, as defined in claim 9, wherein said passageway providing means includes an elongated body of heat resistance material having a plurality of bores therethrough, and said electrical resistance means including a plurality of resistance wires respectively disposed in said bores.

11. An apparatus, as defined in claim 9, which includes means providing a single source of fluid under pressure connected with said passageway means and with said chamber, and means for selectively directing the fluid under pressure to said passageway means and said chamber.

12. An apparatus, as defined in claim 11, wherein said heater unit includes openings means providing communication between said passageway means and said chamber for enabling a small portion of the fluid to flow between the passageway means and the chamber.

13. A method for processing cartons having sections to be joined together and a substantially flat coating of heat responsive adhesive material on at least one of said sections, comprising continuously advancing a plurality of cartons in succession along a predetermined path of travel, directing a stream of heated gas at a predetermined work station adjacent said path of travel against a predetermined area of said adhesive material on at least one of said sections of successive articles at said work station and softening the adhesive material and displacing portions of the softened adhesive material for providing thickened areas of the softened adhesive material, interrupting said stream of heated gas in the absence of a carton at said work station, and forcing said sections of successive cartons into contact with each other for causing the heat responsive adhesive material to join said sections.

References Cited by the Examiner

UNITED STATES PATENTS

| 1,807,951 | 6/1931 | Ahern | 219—39 |
| 2,014,455 | 9/1935 | Schwab | 219—39 |
| 2,587,422 | 2/1952 | Wills | 156—497 |
| 2,676,642 | 4/1954 | Bergstein et al. | 156—497 |

FRANK E. BAILEY, *Primary Examiner.*

EARL M. BERGERT, *Examiner.*

W. J. VAN BALEN, *Assistant Examiner.*